(12) United States Patent
Hunold et al.

(10) Patent No.: US 8,919,216 B2
(45) Date of Patent: Dec. 30, 2014

(54) DOUBLE CLUTCH TRANSMISSION OF A MOTOR VEHICLE

(75) Inventors: Bernard Hunold, Friedrichshafen (DE); Eckhardt Lubke, Friedrichshafen (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 322 days.

(21) Appl. No.: 13/512,941

(22) PCT Filed: Nov. 3, 2010

(86) PCT No.: PCT/EP2010/066689
§ 371 (c)(1),
(2), (4) Date: May 31, 2012

(87) PCT Pub. No.: WO2011/072944
PCT Pub. Date: Jun. 23, 2011

(65) Prior Publication Data
US 2012/0240700 A1    Sep. 27, 2012

(30) Foreign Application Priority Data
Dec. 14, 2009   (DE) .......................... 10 2009 054 595

(51) Int. Cl.
| | |
|---|---|
| F16H 1/26 | (2006.01) |
| F16H 57/00 | (2012.01) |
| F16H 37/04 | (2006.01) |
| F16D 25/10 | (2006.01) |
| F16D 21/04 | (2006.01) |
| F16D 25/061 | (2006.01) |
| F16H 3/095 | (2006.01) |
| F16H 3/00 | (2006.01) |

(52) U.S. Cl.
CPC ................ *F16D 25/10* (2013.01); *F16D 21/04* (2013.01); *F16D 25/061* (2013.01); *F16H 3/095* (2013.01); *F16H 57/0025* (2013.01); *F16H 3/006* (2013.01); *F16H 2200/0052* (2013.01); *F16H 2200/0086* (2013.01)
USPC .................................. 74/330; 74/331; 74/451

(58) Field of Classification Search
CPC ......... F16H 3/006; F16H 3/093; F16H 55/14; F16H 57/0025
USPC ......... 74/330, 331, 333, 411, 451; 403/359.1, 403/365
See application file for complete search history.

(56) References Cited

U.S. PATENT DOCUMENTS

| | | | |
|---|---|---|---|
| 3,167,967 A | * | 2/1965 | Silberger ........................ 74/411 |
| 4,075,870 A | | 2/1978 | Seifried |

(Continued)

FOREIGN PATENT DOCUMENTS

| | | |
|---|---|---|
| DE | 24 47 582 A1 | 4/1976 |
| DE | 28 17 106 A1 | 11/1978 |
| DE | 35 46 454 A1 | 2/1987 |

(Continued)

OTHER PUBLICATIONS

German Search Report issued in corresponding German Application No. 10 2009 054 595.6 mailed on Sep. 19, 2013.

*Primary Examiner* — William C Joyce
(74) *Attorney, Agent, or Firm* — Davis & Bujold, PLLC; Michael J. Bujold

(57) ABSTRACT

A double clutch transmission of a motor vehicle with a first input shaft (W1) formed as a hollow shaft and a longer, second input shaft (W2) arranged coaxially inside the first input shaft (W1). Each of input shaft is in driving connection, by way of an associated input constant (EK1, EK2), with at least one countershaft (W3a, W3b) arranged axis-parallel to the first and the second input shafts (W1, W2). To avoid jamming of the gearteeth (4, 5a, 5b; 6, 7a, 7b) of the respective, non-load-transmitting input constant (EK1, EK2), the fixed wheel (6), arranged on the associated input shaft (W2) in at least one of the input constants, is arranged in a rotationally fixed manner by first carrier gearteeth (19) on a support sleeve (20) which, in turn, is connected in a rotationally fixed manner by second carrier gearteeth (21, 21') to the input shaft (W2) concerned.

13 Claims, 4 Drawing Sheets

(56) References Cited

U.S. PATENT DOCUMENTS

| | | |
|---|---|---|
| 5,921,137 A | 7/1999 | Buri et al. |
| 6,405,612 B1 * | 6/2002 | Kinoshita et al. ............... 74/411 |
| 7,044,013 B2 | 5/2006 | Ahrens |
| 8,069,742 B2 | 12/2011 | Dittrich et al. |
| 2008/0184846 A1 | 8/2008 | Jackson |

FOREIGN PATENT DOCUMENTS

| | | |
|---|---|---|
| DE | 41 23 493 A1 | 1/1993 |
| DE | 196 33 279 A1 | 2/1998 |
| DE | 101 53 014 A1 | 5/2003 |
| EP | 2 128 495 A1 | 12/2009 |
| GB | 2 258 020 A | 1/1993 |

* cited by examiner

DOUBLE CLUTCH TRANSMISSION OF A MOTOR VEHICLE

This application is a National Stage of PCT/EP2010/066689 filed Nov. 3, 2010, which claims priority from German patent application serial no. 10 2009 054 595.6 filed Dec. 14, 2009.

FIELD OF THE INVENTION

The invention concerns a double clutch transmission of a motor vehicle, with a first input shaft in the form of a hollow shaft and a longer, second input shaft arranged within the first input shaft, each respectively in driving connection by way of an associated input constant with at least one countershaft arranged axis-parallel to the two input shafts.

BACKGROUND OF THE INVENTION

Double clutch transmissions with various configurations have been known for a long time. Apart from special designs, a common feature of all double clutch transmissions is that they have two input shafts, the first of which is formed as a shorter, hollow shaft and the second is longer and is arranged coaxially inside the first input shaft. The two input shafts can be connected to the drive shaft of a drive motor, in each case by way of an associated friction clutch of a double clutch arrangement.

Different versions of double clutch transmissions differ from one another essentially in the number and arrangement of countershafts and in the disposition of the output shafts. Further differing features of double clutch transmissions consist in the type and number of driving connections between the transmission shafts, which can be in the form of input constants, output constants, or shiftable gear ratio steps.

For example, DE 35 46 454 C2 describes a double clutch transmission with a first input shaft in the form of a hollow shaft, a longer, second input shaft arranged coaxially inside the first input shaft, and a countershaft arranged axis-parallel to the two input shafts. At the same time the countershaft forms the output shaft of the double clutch transmission and for that purpose has at its end on the motor side a bevel pinion for driving a bevel gear of an axle differential. By way of associated shiftable gear wheel sets whose fixed wheels are arranged respectively on one of the input shafts, the two input shafts can be selectively connected to the output or countershaft; the first input shaft via the gear wheel set of the even gears (G2, G4) and the second input shaft via the gear wheel set of the uneven gears (G1, G3, G5) and the reverse gear (R). A special feature is that the known double clutch transmission comprises a shiftable clutch for coupling the two input shafts, whereby during starting off the two friction clutches can at the same time be used as starting clutches, so avoiding unacceptably severe heating of a single friction clutch.

In contrast, DE 41 23 493 C2 describes a double clutch transmission with a first input shaft formed as a hollow shaft, a longer, second input shaft arranged coaxially inside the first input shaft, and a countershaft arranged axis-parallel to the two input shafts, in which the output shaft is formed by a further transmission shaft arranged colinearly, i.e. coaxially and axially adjacent to the two input shafts. Whereas the first input shaft is in driving connection with the countershaft via an input constant, the second input shaft can be connected selectively to the countershaft by way of two shiftable input gear ratio steps whose fixed wheels are arranged on the second input shaft. On the output side, the countershaft can be selectively connected, via three shiftable output gear steps, to the output shaft which, to engage a direct gear, can also be coupled directly to the second input shaft.

A further double clutch transmission with a first input shaft made as a hollow shaft and a longer, second input shaft arranged coaxially inside the first input shaft is known from DE 101 53 014 A1. This double clutch transmission has two countershafts arranged parallel to the two input shafts, which together with the two input shafts are arranged in a V-shape and are in connection with a common drive output element, in each case by way of a fixed output wheel. To engage the uneven gears (G1, G3, G5) the second input shaft can be connected selectively, via shiftable gearsets, to the first countershaft and to the second countershaft. To engage the even gears (G2, G4, G6) and the reverse gear (R), the first input shaft can be connected selectively, via shiftable gearsets, to the first and to the second countershaft. The fixed wheels of the gearsets are respectively arranged on the associated input shafts.

In transmissions of countershaft design and also in double clutch transmissions, the radial distance between the input shafts and the countershafts can deviate from the ideal value by an amount on the order of a few tenths of a millimeter. Moreover, deflection of the load-transmitting input shafts and countershafts under load results in further deviations from the ideal radial distance. At the gear wheels of the non-load-transmitting input constants and of the shiftable gear steps such deviations can result in jamming and consequently to reduced transmission efficiency and increased wear. Whereas in the case of the shiftable gears, jamming can usually be avoided by virtue of a greater axial play of the radial bearings by which the loose wheels are mounted to rotate on the transmission shaft concerned, until now no suitable measure for this has been known for fixed wheels of the transmission arranged in a rotationally fixed manner on an input shaft.

SUMMARY OF THE INVENTION

Accordingly, the purpose of the invention is to propose a double clutch of the type mentioned to begin with, in which jamming of the gear wheels of the non-load-transmitting input constants can be prevented by technically simple and inexpensive design means.

According to the invention, this objective is achieved in that in at least one of the input constants the fixed wheel arranged on the associated input shaft is arranged in a rotationally fixed manner, via first carrier gear teeth, on a support sleeve, which for its part is connected in a rotationally fixed manner, via second carrier gear teeth, to the input shaft concerned.

Such axially orientated carrier gear teeth have a certain radial play without special measures. Thus, without special measures, by virtue of the support sleeve and its rotationally fixed connection to the fixed wheel and to the input shaft, in each case via carrier gear teeth, an amount of radial play is made available which enables limited radial displacement and limited tilting of the fixed wheel relative to the associated input shaft. Furthermore, the plug-in type connection of the fixed wheel and the support sleeve on the associated input shaft facilitate assembly of the double clutch transmission.

In a preferred embodiment it is provided that in the transmission-internal input constant, the fixed wheel arranged on the associated input shaft is arranged in a rotationally fixed manner by means of first carrier gear teeth on a support sleeve, which in turn is connected in a rotationally fixed manner, via second carrier gear teeth, to the associated input shaft.

If the normal radial play of the carrier gear teeth is not sufficient to avoid jamming of the gear wheels, the first carrier gear teeth and/or the second carrier gear teeth can be made with a larger radial play which deviates from that specified in the DIN standard usually applied.

A further design measure intended in particular to enable some tilting of the fixed wheel on the drive input side is to make the first carrier gear teeth and/or the second carrier gear teeth in the manner of a curved-tooth coupling, i.e. with an axially convex curvature. In this way, if the associated countershaft is deflected under load the fixed wheel on the input shaft side can adapt to the inclination of the fixed wheel on the countershaft side, whereby jamming of the two gear wheels is prevented.

To ensure sufficient stability of the connection of the fixed wheel to the input shaft, it can be provided that the support sleeve and the associated input shaft are in each case provided, in an axial area close to the gear wheel, with a geared section of the second carrier gear teeth and, in an axial area farther from the gear wheel, with a smooth guiding section.

Alternatively, however, the support sleeve and the associated input shaft can in each case be provided, in an axial area close to and farther from the gear wheel, with a geared section of the second carrier gear teeth and, in a central axial area, with a smooth guiding section. By virtue of the arrangement of the geared sections axially on both sides, this design allows greater tilting of the support sleeve and hence of the fixed wheel concerned relative to the associated input shaft, while maintaining a rotationally fixed connection.

If, for example for reasons relating to structural space and assembly, the design variants described above can only be used with one input constant, preferably the transmission-internal input constant, then jamming of the gear wheels of the other, preferably transmission-external input constant, can be prevented by designing the gear wheels of that input constant with a larger tooth flank clearance.

The design of the input constants according to the invention can basically be used in any double clutch transmissions having the characteristics mentioned at the start. However, the design of the input constants according to the invention is particularly appropriate in a double clutch transmission in which the two input shafts are in driving connection via the associated input constants with at least one common countershaft, which can be connected, via a plurality of shiftable output gear steps, to an output shaft arranged collinearly with the two input shafts and mounted axially by means of an axial bearing arrangement relative to the second input shaft. With this design of a double clutch transmission the inner fixed wheels of the input constants on the input side are practically clamped between the associated fixed wheels of the countershafts, so that radial compensation of the inner fixed wheels is particularly important in this case.

According to the invention, a double clutch transmission of this type can be derived from a group transmission of countershaft design with a main transmission and a splitter group connected upstream therefrom, since the splitter group and the single friction clutch are replaced by two coaxial input shafts, each with an input constant, and a double clutch arrangement. Deviating from the double clutch transmissions known until now, in this double clutch transmission only every second shift, namely those in which the shift position of the load-transmitting shifting clutch of the output gear step concerned can be maintained and, by an overlapping disengagement of one friction clutch and engagement of the other friction clutch, only the load-transmitting input shaft is changed, this being carried out as a powershift, i.e. without interruption of the traction force. In this way the function of synchronization, which in conventional transmissions is performed in the upstream splitter group by elaborate synchronization means, is integrated into the powershiftable double clutch. This makes it advantageously possible to reduce the amount of axial space occupied by the splitter group, since the gear wheels of the two input constants are arranged closer to one another whereby they at least partially occupy the structural space taken up by the synchronization means otherwise used. In such a shortened gearset design, in order to guarantee the necessary transmission reliability of the two input constant gear wheels on the countershaft, they can for example be welded to the countershaft.

In contrast, if despite the absence of synchronization means the arrangement related to the axial position of the gear wheels of the constants is preserved, then this has the advantage that further components such as the countershafts with their input constant wheels can be used as identical components, both in double clutch transmissions according to the invention and in conventional, non-powershiftable variable-speed transmissions with two input constants.

BRIEF DESCRIPTION OF THE DRAWINGS

To clarify the invention the description of drawings with example embodiments is attached. The drawings show.

DETAILED DESCRIPTION OF THE PREFERRED EMBODIMENTS

Figure 3:
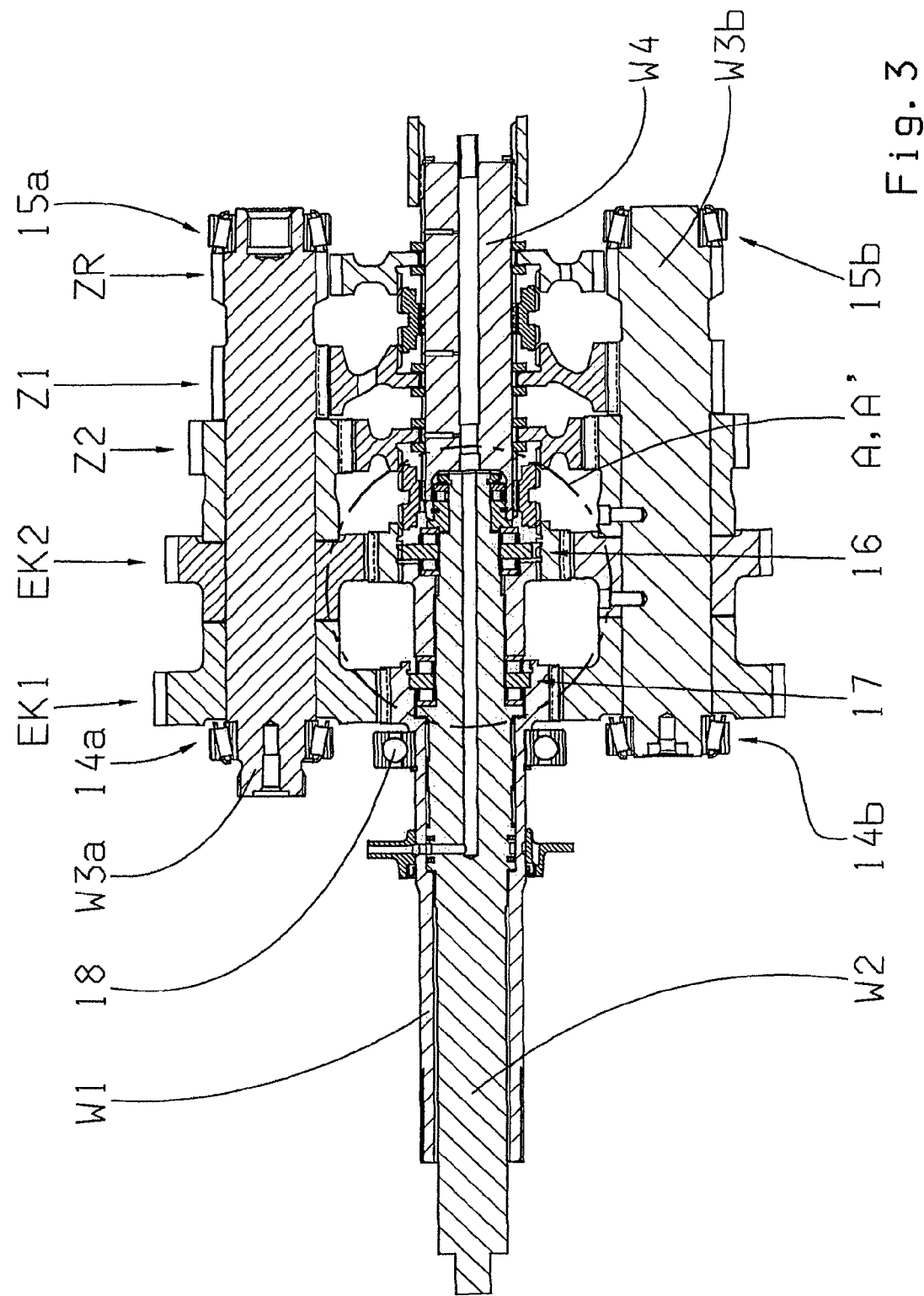
FIG. 3: Central longitudinal section through a double clutch transmission.
Figure 4:
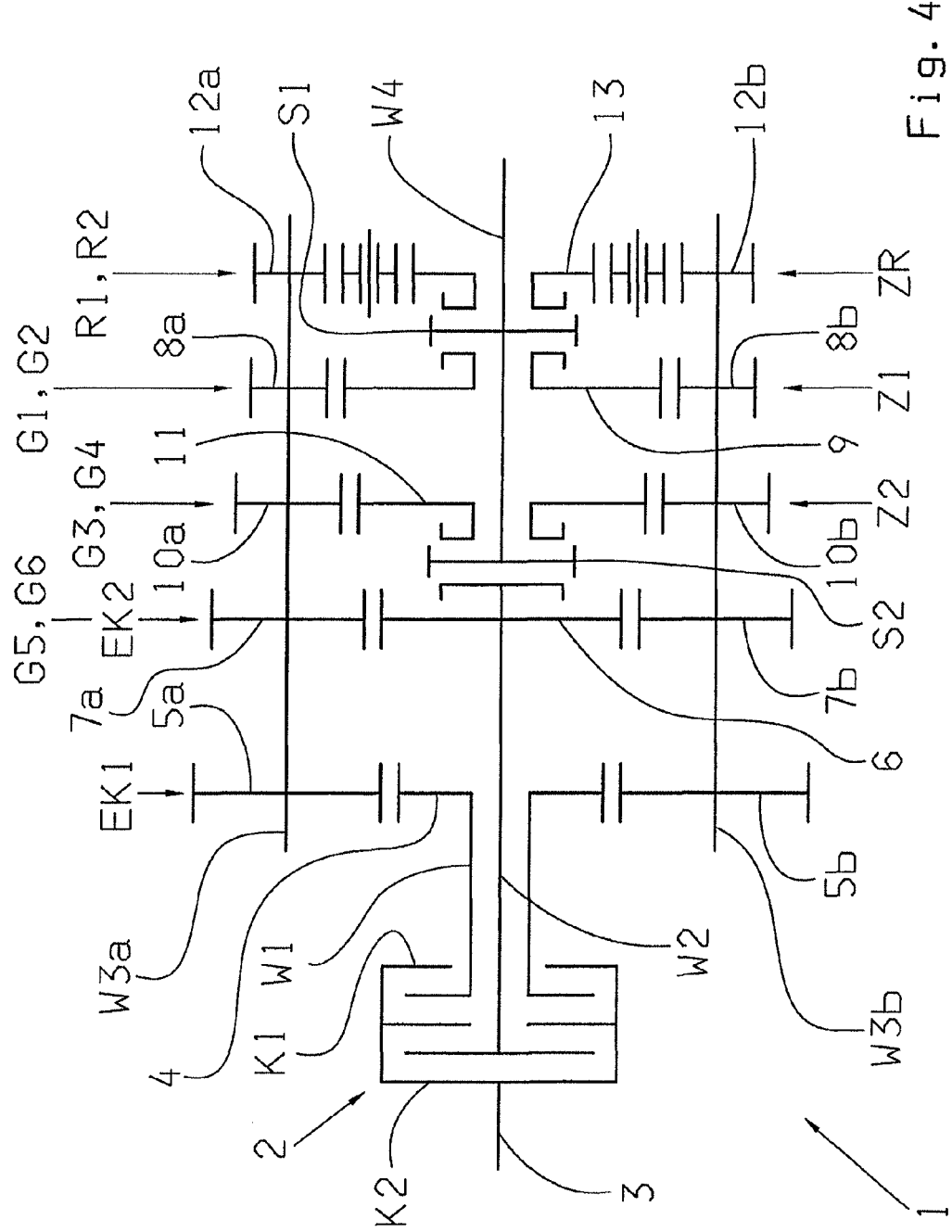
FIG. 4: A schematic depiction of the double clutch transmission of FIG. 3.

A double clutch transmission 1 pictured as a central longitudinal section in FIG. 3, the principle of whose structure is also represented for the sake of clarity in the schematic view shown in FIG. 4, comprises two input shafts W1, W2, two countershafts W3$a$, W3$b$ and an output shaft W4. The shorter, first input shaft W1 is in the form of a hollow shaft and on the drive input side can be connected by means of a first friction clutch K1 of a double clutch arrangement 2 to the drive shaft 3 of a drive motor (not shown). The longer, second input shaft W2 is arranged coaxially inside the first input shaft W1 and on the drive input side can be connected by a second friction clutch K2 of the double clutch arrangement 2 to the drive shaft 3 of the drive motor. The two countershafts W3$a$, W3$b$ have identical gear wheels 5$a$, 5$b$; 7$a$, 7$b$; 8$a$, 8$b$; 10$a$, 10$b$; 12$a$, 12$b$ which are fixed wheels and in relation to the common rotational axis of the two input shafts W1, W2, are arranged at the same distance diagonally opposite one another.

The first input shaft is in driving connection with the two countershafts W3$a$, W3$b$ via a first input constant EK1 having a higher gear ratio, a common fixed wheel 4 of the first input shaft W1 being used for driving the two countershafts W3$a$, W3$b$. In the same way the second input shaft W2 is in driving connection with the two countershafts W3$a$, W3$b$ via a second input constant EK2 having a lower gear ratio, a common fixed wheel 6 of the second input shaft W2 being used for driving the two countershafts W3$a$, W3$b$.

The output shaft W4 is arranged collinearly, i.e. coaxially and axially close to the input shafts W1, W2, in particular axially adjacent to the longer, second input shaft W2. By way of three output gears Z1, Z2 and Z3 along with a reversing gear ZR, each respectively comprising a fixed wheel 8a, 8b; 10a, 10b; 12a, 12b on the respective countershafts W3a, W3b and a loose wheel 9, 11, 13 mounted to rotate on the output shaft W4, the output shaft W4 can be connected by means of associated shifting clutches to the two countershafts W3a, W3b.

The two shifting clutches for the reversing gearset ZR and the first forward gearset Z1 (with a high gear ratio) are combined in a first shifting packet S1. Likewise, the shifting clutches for the second forward gearset Z2 (with a medium gear ratio) and a direct shifting clutch for the direct connection of the second input shaft W2 to the output shaft W4 are combined in a second shifting packet S2. Accordingly, a total of six forward gears G1 to G6 and two reverse gears R1, R2 can be engaged, such that the force flow passes for the relatively lower gears G1, G3, G5, R1 by way of the first friction clutch K1 and the first input shaft W1, and for the respectively higher gears G2, G4, G6, R2 by way of the second friction clutch K2 and the second input shaft W2.

In this double clutch transmission 1 which is derived, from a known group transmission of the AS-Tronic series produced by ZF Friedrickshafen AG, by replacing the splitter group (upstream group) present therein and the single friction clutch by the two input shafts W1, W2, the double clutch arrangement 2 and the input constants EK1, EK2, it is possible to carry out every second shift, namely those not involving a change of the load-transmitting shifting clutch (S1, S2), as a powershift, i.e. without interruption of the traction force.

To achieve the transmission-internal axial force equalization, the gearwheels of the two input constants EK1, EK2 and of the three output gear steps Z1, Z2, ZR are designed with opposed, suitably inclined helical gearing. Consequently, on the one hand a largely complete axial force compensation takes place in each of the countershafts W3a, W3b. Thus, the mounting of the countershafts W3a, W3b in the transmission housing (not shown) in each case in the form of a fitted mounting system of radial conical roller bearings 14a, 15a; 14b, 15b arranged axially at the ends and axially lightly braced relative to one another, is largely free from axial force (FIG. 3).

In order also to achieve substantial axial force equalization in the centrally arranged transmission shafts W1, W2, W4, by means of an axial bearing arrangement 16 known from DE 196 33 279 A1 on one side and by means of a bearing arrangement 17 in the form of a two-row axial cylindrical roller bearing on the other side, the second input shaft W2 is connected, respectively, to the output shaft W4 and to the first input shaft W1. Thanks to this design, independently of the load-transmitting input shaft W1, W2 only a small resultant axial force is transmitted into the transmission housing by way of the fixed bearing 18 formed as a radial grooved ball bearing and arranged on the first input shaft W1.

Figure 1:
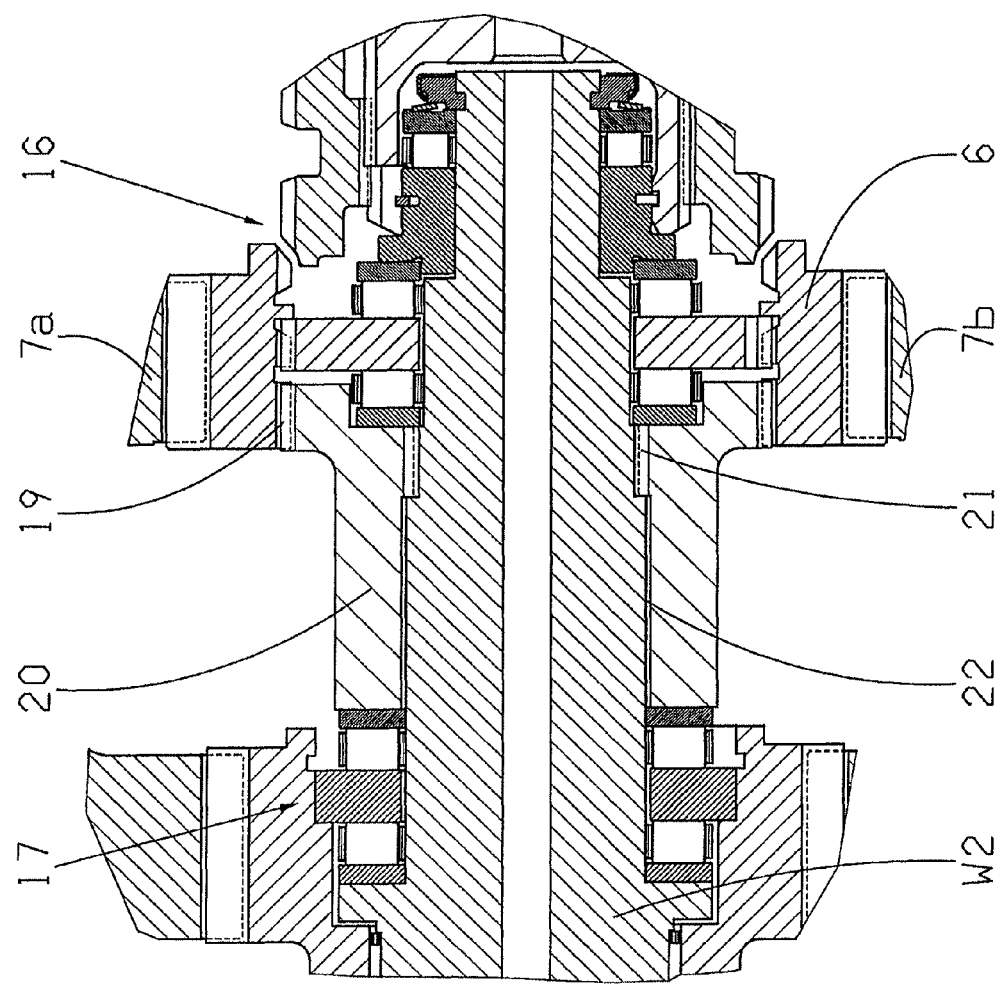
FIG. 1: An enlarged section of the double clutch transmission shown in FIG. 3, with a first embodiment of an input constant.

Section A of FIG. 3 is shown enlarged in FIG. 1, it can be seen more clearly that the fixed wheel 6 of the second input constant EK2 arranged on the second input shaft W2 is attached in a rotationally fixed manner by means of first carrier gear teeth 19 on a support sleeve 20, which in turn is connected in a rotationally fixed manner by means of second carrier gear teeth 21 to the second input shaft W2. The second carrier gear teeth 21 are formed on the support sleeve 20 and on the second input shaft W2 only in an axial area close to the gear wheel. In an axially adjacent axial area farther away from the gear wheel the support sleeve 20 and the second input shaft W2 are provided with a smooth guiding section 22. Snugly in contact with the free axial end of the support sleeve 20 is a rotary disk of the twin-row axial cylindrical roller bearing of the bearing arrangement 17.

Figure 2:
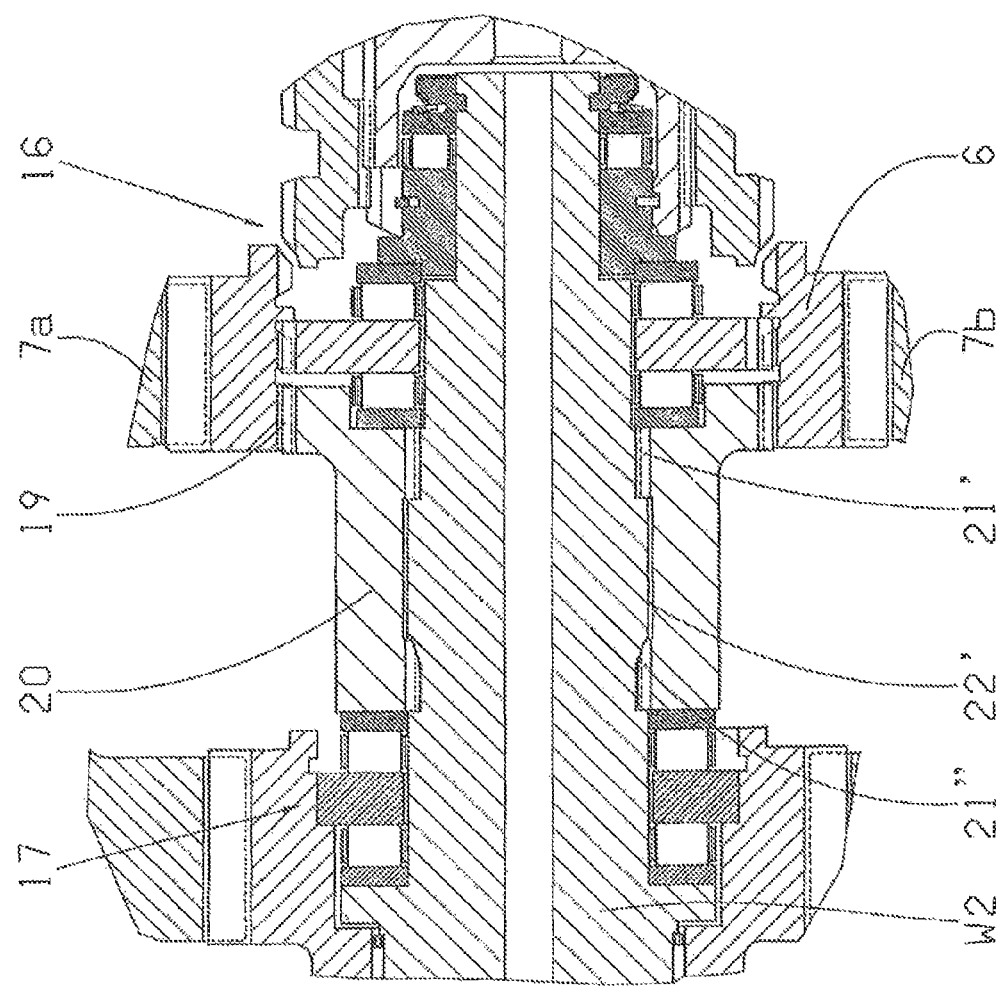
FIG. 2: An enlarged section of the double clutch transmission shown in FIG. 3, with a second embodiment of an input constant.

A second embodiment variant of the second input constant EK2 represented in the section A' of FIG. 3 is shown enlarged in FIG. 2, and differs from the first embodiment in FIG. 1 in that the second carrier gear teeth 21', 21" between the support sleeve 20 and the second input shaft W2 are now distributed on axial areas close to and farther away from the gear wheel, which delimit a central axial area having a smooth guiding section 22'. According to this embodiment, the second carrier gear teeth 21" farther away from the gear wheel has a curved-tooth coupling, i.e., with an axially convex curvature.

The use of the support sleeve 20 and its rotationally fixed connection to the fixed wheel 6 and to the second input shaft W2, respectively by means of carrier gear teeth 19, 21, 21', enables limited radial displacement and limited tilting of the fixed wheel 6 relative to the second input shaft W2, so that jamming of this fixed wheel 6 with the associated fixed wheels 7a, 7b of the countershafts W3a, W3b is largely excluded. Furthermore, the plug-in type connection of the fixed wheel 6 and the support sleeve 20 on the second input shaft W2 facilitates assembly of the double clutch transmission 1.

INDEXES

1 Double clutch transmission
2 Double clutch arrangement
3 Drive shaft
4 Fixed wheel of EK1
5a, 5b Fixed wheel of EK1
6 Fixed wheel of EK2
7a, 7b Fixed wheel of EK2
8a, 8b Fixed wheel of Z1
9 Loose wheel of Z1
10a, 10b Fixed wheel of Z2
11 Loose wheel of Z2
12a, 12b Fixed wheel of ZR
13 Loose wheel of ZR
14a, 14b Radial conical roller bearing
15a, 15b Radial conical roller bearing
16 Axial bearing arrangement
17 Bearing arrangement
18 Fixed bearing
19 First carrier gear teeth
20 Support sleeve
21, 21' Second carrier gear teeth
22, 22' Guiding section
A, A' Enlarged section
EK1 First input constant
EK2 Second input constant
G1-G6 Forward gears
K1 First friction clutch
K2 Second friction clutch
R1, R2 Reverse gear
ZR Reversing gearset
Z1, Z2 Output gearset
W1 First input shaft
W2 Second input shaft
W3a, W3b Countershaft
W4 Output shaft

The invention claimed is:

1. A double clutch transmission of a motor vehicle, the double clutch transmission comprising:

a first input shaft (W1) formed as a hollow shaft and a longer, second input shaft (W2) arranged coaxially inside the first input shaft (W1), each of the first and the second input shafts being in driving connection by way of an associated input constant (EK1, EK2) with at least one countershaft (W3a, W3b) that is arranged axis-parallel to the first and the second input shafts (W1, W2);

for at least one of the input constants, a fixed gearwheel (6), arranged on an associated input shaft (W2), being arranged in a rotationally fixed manner by first carrier gearteeth (19) on a support sleeve (20);

the support sleeve being connected, in a rotationally fixed manner, by second carrier gearteeth (21, 21') to the associated input shaft (W2); and the support sleeve (20) and the associated input shaft (W2) both being provided, in an axial area adjacent the fixed gearwheel, with a toothed section of the second carrier gearteeth (21) and, in an axial area further away from the gearwheel, with a smooth guiding section (22).

2. The double clutch transmission according to claim 1, wherein, for a transmission-innermost input constant (EK2), the fixed gearwheel (6) arranged on the associated input shaft (W2) is arranged in a rotationally fixed manner by the first carrier gearteeth (19) on the support sleeve (20) which, in turn, is connected in a rotationally fixed manner by the second carrier gearteeth (21, 21') to the input shaft (W2) concerned.

3. The double clutch transmission according to claim 1, wherein at least one of the first carrier gearteeth (19) and the second carrier gearteeth (21, 21) have a larger radial play.

4. The double clutch transmission according to claim 1, wherein at least one of the first carrier gearteeth (19) and the second carrier gearteeth (21, 21) have an axially convex curvature.

5. The double clutch transmission according to claim 1, wherein gearwheels (4, 5a, 5b) of an other input constant have a larger tooth flank clearance.

6. The double clutch transmission according to claim 1, wherein by way of the associated input constants (EK1, EK2), the first and the second input shafts (W1, W2) are in driving connection with at least one common countershaft (W3a, W3b), which is connectable, via a plurality of shiftable output gear steps (Z1, Z2, Z3), to an output shaft (W4) which is arranged co-linearly to the first and the second input shafts (W1, W2) and axially supported relative to the second input shaft (W2) by an axial bearing arrangement (16).

7. The double clutch transmission according to claim 1, wherein the rotationally fixed connection of the support sleeve (20) to both the fixed gearwheel (6) and the second input shaft (W2) facilitates assembly of the double clutch transmission (1) as well as provides limited radial displacement and tilting of the fixed gearwheel (6), relative to the second input shaft (W2), so at to prevent jamming of the fixed gearwheel (6) with mating fixed wheels (7a, 7b) of the at least one countershaft (W3a, W3b).

8. The double clutch transmission according to claim 1, wherein the fixed gearwheel (6) of the second input constant (EK2) is connected to the support sleeve (20) by the first carrier gearteeth (19) respectively carried by the fixed gearwheel (6) and the support sleeve (20), and the support sleeve (20) is connected to the second input shaft (W2) by the second carrier gearteeth (21) respectively carried by both the support sleeve (20) and the second input shaft (W2), and the second carrier gearteeth (21) are only located adjacent one end of the support sleeve (20) while the smooth guiding section (22) is located in a middle section and adjacent an opposite end of the support sleeve (20).

9. A double clutch transmission of a motor vehicle, the double clutch transmission comprising:

a first input shaft (W1) formed as a hollow shaft and a longer, second input shaft (W2) arranged coaxially inside the first input shaft (W1), each of the first and the second input shafts being in driving connection, by way of an associated input constant (EK1, EK2), with at least one countershaft (W3a, W3b) arranged axis-parallel to the two input shafts (W1, W2);

for at least one of the input constants, a fixed gearwheel (6), arranged on the associated input shaft (W2), being arranged in a rotationally fixed manner by first carrier gearteeth (19) on a support sleeve (20);

the support sleeve being connected, in a rotationally fixed manner, by second carrier gearteeth (21, 21') to the associated input shaft (W2); and the support sleeve (20) and the associated input shaft (W2) both being provided, in an axial area adjacent to the gearwheel and, in an axial area further away from the gearwheel, with a toothed section of the second carrier gearteeth (21') and both the support sleeve (20) and the associated input shaft (W2), in a central axial area, having a smooth guiding section (22').

10. The double clutch transmission according to claim 9, wherein the gearwheels (4, 5a, 5b) of a transmission-outermost input constant (EK1) have a larger tooth flank clearance.

11. The double clutch transmission according to claim 9, wherein the rotationally fixed connection of the support sleeve (20) to both the fixed gearwheel (6) and the second input shaft (W2) facilitates assembly of the double clutch transmission (1) as well as provides limited radial displacement and tilting of the fixed gearwheel (6), relative to the second input shaft (W2), so at to prevent jamming of the fixed gearwheel (6) with mating fixed wheels (7a, 7b) of the at least one countershaft (W3a, W3b).

12. The double clutch transmission according to claim 9, wherein the fixed gearwheel (6) of the second input constant (EK2) is connected to the support sleeve (20) by the first carrier gearteeth (19) respectively carried by the fixed gearwheel (6) and the support sleeve (20), and the support sleeve (20) is connected to the second input shaft (W2) by the second carrier gearteeth (21) respectively carried by both the support sleeve (20) and the second input shaft (W2), and the second carrier gearteeth (21) are located adjacent both ends of the support sleeve (20) while the smooth guiding section (22) is located only in a middle section of the support sleeve (20).

13. A double clutch transmission of a motor vehicle, the double clutch transmission comprising:

first and second input shafts, the first input shaft being a hollow shaft and comprising an end continuously connected with the double clutch, the second input shaft comprises an end continuously connected with the double clutch, and the second input shaft extending coaxially within and at least partially through the first input shaft;

an end of the first input shaft remote from the double clutch being drivingly connected, via a first input constant, to at least one countershaft and an end of the second input shaft remote from the double clutch being drivingly connected, via a second input constant, to the at least one countershaft, and the at least one countershaft being axially parallel to the first and the second input shafts; and a support sleeve continuously rotationally coupling a gearwheel of the second input constant to gear teeth of the second input shaft, the support sleeve comprising an axial section having a radially inner, smooth guiding section and an axial gear section comprising radially inner, carrier gear teeth and radially outer, carrier gear teeth, the inner carrier gear teeth continuously rotationally engaging the gear teeth of the second input shaft, the outer carrier gear teeth continuously rotationally engaging the gearwheel of the second input constant, and the support sleeve being supported on the second input shaft such that the smooth guiding section being axially located further away from the gearwheel of the second input constant than the axial gear section.

* * * * *